United States Patent
Chen (10) Patent No.: US 10,922,533 B2
(45) Date of Patent: Feb. 16, 2021

(54) METHOD FOR FACE-TO-UNLOCK, AUTHENTICATION DEVICE, AND NON-VOLATILE STORAGE MEDIUM

(71) Applicants: BEIJING KUANGSHI TECHNOLOGY CO., LTD., Beijing (CN); MEGVII (BEIJING) TECHNOLOGY CO., LTD., Beijing (CN)

(72) Inventor: Keqing Chen, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

(*) Notice: Subject to any disclaimer, the term of this patent is extended or adjusted under 35 U.S.C. 154(b) by 183 days.

(21) Appl. No.: 16/146,947

(22) Filed: Sep. 28, 2018

(65) Prior Publication Data
US 2019/0122034 A1    Apr. 25, 2019

(30) Foreign Application Priority Data

Oct. 23, 2017  (CN) .......................... 2017 1 0993345

(51) Int. Cl.
*G06K 9/00* (2006.01)
*G06F 21/32* (2013.01)

(52) U.S. Cl.
CPC ......... *G06K 9/00315* (2013.01); *G06F 21/32* (2013.01); *G06K 9/00281* (2013.01); *G06K 9/00288* (2013.01)

(58) Field of Classification Search
None
See application file for complete search history.

(56) References Cited

U.S. PATENT DOCUMENTS

2015/0379332 A1* 12/2015 Matsunaga ........ G06K 9/00268
348/77
2017/0116490 A1  4/2017 Han et al.
(Continued)

FOREIGN PATENT DOCUMENTS

CN         1786980       6/2006
CN        101908149     12/2010
(Continued)

OTHER PUBLICATIONS

First Chinese Office Action, issued in the corresponding Chinese Patent application No. 201710993345.5, dated Dec. 4, 2019, 22 pages.
(Continued)

*Primary Examiner* — Wei Wen Yang
(74) *Attorney, Agent, or Firm* — Hamre, Schumann, Mueller & Larson, P.C (57) ABSTRACT

The disclosure provides method for face-to-unlock, authentication device, and non-volatile storage medium. The method for face-to-unlock includes: obtaining to-be-verified expression data of a to-be-verified expression of a to-be-verified object; comparing the to-be-verified expression data with pre-stored expression data to obtain a comparison result; and in the case where the comparison result indicates that the to-be-verified expression data matches the pre-stored expression data, releasing the lock.

15 Claims, 3 Drawing Sheets

(56) References Cited

U.S. PATENT DOCUMENTS

2018/0373924 A1* 12/2018 Yoo .................... G06F 21/32
2019/0279347 A1*  9/2019 Hayasaka ............. G06T 5/50

FOREIGN PATENT DOCUMENTS

| | | |
|---|---|---|
| CN | 102405638 | 2/2012 |
| CN | 102946481 | 2/2013 |
| CN | 103035022 | 4/2013 |
| CN | 103778360 | 5/2014 |
| CN | 104657713 | 5/2015 |
| CN | 104820829 | 8/2015 |
| CN | 104978764 | 10/2015 |
| CN | 105279479 | 1/2016 |
| CN | 105678235 | 6/2016 |
| CN | 105825112 | 8/2016 |
| CN | 106203038 | 12/2016 |
| CN | 106650555 | 5/2017 |
| CN | 106778525 | 5/2017 |

OTHER PUBLICATIONS

Dong et al., "Optimization of SIFT Feature Matching Algorithm", Journal of Shenyang Ligong University, vol. 36, No. 3, Jun. 2017.

* cited by examiner

FIG. 6

METHOD FOR FACE-TO-UNLOCK, AUTHENTICATION DEVICE, AND NON-VOLATILE STORAGE MEDIUM

CROSS-REFERENCE TO RELATED APPLICATION

The present application claims the priority of Chinese patent application No. 201710993345.5 filed on Oct. 23, 2017, the disclosure of which is incorporated herein by reference in its entirety.

TECHNICAL FIELD

The embodiments of the present disclosure relate to method for face-to-unlock, authentication device, and non-volatile storage medium.

BACKGROUND

With the development of society, the advancement of technology, the acceleration of life rhythm and the improvement of consumption level, face-to-unlock technology has been widely used in information security fields such as computer login and mobile phone login etc.

The current face-to-unlock technology usually uses one or more cameras (or other sensors) to capture the user's face information, and extracts facial features of the face information, thereby compares the facial features with facial features stored in a face database to determine whether to unlock a device. However, the conventional face-to-unlock technology cannot distinguish two people whose facial features are very similar, such as twins, or sisters who have similar looks and dress up similarly. Moreover, since two people whose facial features are very similar are both living bodies, they cannot be distinguished by liveness detection.

SUMMARY

The embodiments of the present disclosure provide methods for face-to-unlock, inputting expression and expression action, authentication device, and non-volatile storage medium, the method for face-to-unlock can effectively distinguish people with similar faces and further enhance the security of face-to-unlock.

According to an aspect of the present disclosure, at least one embodiment provides a method for face-to-unlock, comprising: obtaining to-be-verified expression data of a to-be-verified expression of a to-be-verified object; comparing the to-be-verified expression data with pre-stored expression data to obtain a comparison result; and in the case where the comparison result indicates that the to-be-verified expression data matches the pre-stored expression data, releasing the lock.

According to another aspect of the present disclosure, at least one embodiment further provides a method for inputting a facial expression, comprising: instructing a to-be-verified object to make a to-be-verified expression; acquiring a facial image that includes the to-be-verified expression of the to-be-verified object; obtaining, from the facial image, a three-dimensional point coordinate sequence of a plurality of landmarks on the face of the to-be-verified object at the time of making the to-be-verified expression, and storing the three-dimensional point coordinate sequence.

According to another aspect of the present disclosure, at least one embodiment further provides a method for inputting a facial expression action, comprising: instructing a to-be-verified object to make a plurality of to-be-verified expressions, wherein the plurality of to-be-verified expressions constitute at least one to-be-verified expression action; acquiring a plurality of facial images that include the plurality of to-be-verified expressions of the to-be-verified object; obtaining, from the plurality of facial images, a point coordinate matrix of a plurality of landmarks that changes with time on the face of the to-be-verified object at the time of making the plurality of to-be-verified expressions; and storing the point coordinate matrix.

According to another aspect of the present disclosure, at least one embodiment further provides an authentication device, comprising: a processor adapted to implement respective instructions; and a memory adapted to store a plurality of instructions, the instructions being adapted to be loaded by the processor and execute: the method for face-to-unlock described above, the method for inputting a facial expression described above, and/or the method for inputting a facial expression action described above.

According to another aspect of the present disclosure, at least one embodiment further provides a computer-readable non-volatile storage medium storing computer program instructions for performing the method for face-to-unlock described above, the method for inputting a facial expression described above, and/or the method for inputting a facial expression action described above, when the computer executes the program instructions.

Through the embodiments of the present disclosure described above, people with similar faces can be effectively distinguished and the security of face-to-unlock can be further enhanced.

BRIEF DESCRIPTION OF THE DRAWINGS

In order to more clearly illustrate the technical solutions in the embodiments of the present disclosure, drawings necessary for describing the embodiments will be briefly introduced below, obviously, these described drawings merely are some embodiments of the present disclosure, for those of ordinary skill in the art, it is possible to attain other drawings based on these drawings without paying creative effort.

DETAILED DESCRIPTION OF THE EMBODIMENTS

Hereinafter, for those skilled in the art to better understand the solutions of the present disclosure, the technical solutions in the embodiments of the present disclosure will be described clearly and comprehensively in combination with the drawings in the embodiments of the present disclosure, obviously, these described embodiments are parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

It should be noted that the terms "first", "second" and the like in the specification, the claims and the drawings mentioned above of the present disclosure are used to distinguish similar objects, and are not necessarily used to describe a specific sequence or an order of precedence. As will be appreciated, the terms so used are interchangeable in appropriate situations, so that the embodiments of the present disclosure described herein can be implemented in a sequence other than those illustrated or described herein. In addition, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment.

According to at least one embodiment of the present disclosure, there is provided a method for face-to-unlock, said method can be applied to an authentication device, and used for, for example, performing face-to-unlock and distinguishing similar faces. It should be noted that the authentication device may include multiple types of authentication modes, such as one or more of face-to-unlock authentication, fingerprint unlock authentication, password unlock authentication, iris unlock authentication, retina unlock authentication, voiceprint unlock authentication, and gesture unlock authentication. Correspondingly, the authentication device may comprise an image acquisition assembly, such as a camera, for acquiring image data, like a facial image and/or a gesture image; and may further comprise a fingerprint acquisition assembly for acquiring a user fingerprint; or may comprise a sound wave acquisition assembly for acquiring a user sound wave; or may comprise an input assembly (such as a keyboard, a touch screen etc.) for obtaining an inputted password; or may comprise an iris acquisition assembly, such as a camera (like an infrared camera), for acquiring user iris data; or may comprise a retinal acquisition assembly, such as a camera, for acquiring user retina data. The authentication device can apply multiple unlocking authentication modes in a comprehensive manner, so that when one authentication mode fails, other authentication modes can be used for authentication, user experience is better, and security is higher.

The authentication device may be various fixed terminals or mobile terminals, the fixed terminals are, for example, terminals fixed on ATM machines, access control etc.; the mobile terminals are, for example, mobile phones, tablet computers, and notebook computers, and may also be portable, handheld, or vehicle-mounted mobile devices etc.

Figure 1:
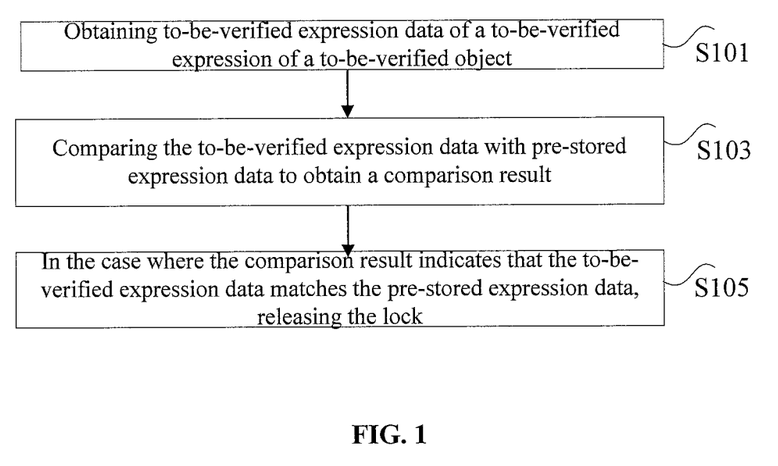
FIG. 1 is a flowchart of a method for face-to-unlock according to an embodiment of the present disclosure.

The authentication device can perform at least one type of unlocking authentication mode. In the case of performing face-to-unlock authentication, the authentication unlocking method of the authentication device in this embodiment is as shown in FIG. 1 and may comprise the following steps:

Step S101, obtaining to-be-verified expression data of a to-be-verified expression of a to-be-verified object;

Step S103, comparing the to-be-verified expression data with pre-stored expression data to obtain a comparison result; and Step S105, in the case where the comparison result indicates that the to-be-verified expression data matches the pre-stored expression data, releasing the lock.

It should be noted that the steps shown in the flowchart of the drawings may be executed in a computer system by running, for example, a set of computer-executable instructions, and although the steps are presented in a certain order in the flowchart, in some situations, the steps shown or described may be executed in an order different from the ones described herein.

In the case of performing face-to-unlock authentication, typically, a facial image of a to-be-verified object may be acquired by an image capturing assembly, such as a camera, thus a to-be-verified expression of the to-be-verified object may be obtained based on the facial image acquired by the camera, the to-be-verified object may be a person who needs identification authentication. The to-be-verified expression mentioned above may be a to-be-verified expression which the authentication device instructs the to-be-verified object to make, for example, the authentication device issues an instruction to the to-be-verified object to perform a to-be-verified expression such as "raise eyebrow", "shake head" or "node head", then the to-be-verified object needs to make the to-be-verified expression such as "raise eyebrow", "shake head" or "node head" according to the instruction, so that the camera can acquire the to-be-verified expression made by the to-be-verified object.

In step S101, to-be-verified expression data of the to-be-verified expression made by the to-be-verified object is obtained. The to-be-verified expression data may be used to represent the to-be-verified expression made by the to-be-verified object, for example, a three-dimensional point coordinate sequence of a plurality of landmarks on a face may be used to represent the to-be-verified expression made by the to-be-verified object, thus the to-be-verified expression data may be a three-dimensional point coordinate sequence including a plurality of landmarks on a face. The above-mentioned landmarks include, but not limited to, landmarks on face contours, eyes, eyebrows, lips, and nose contours. Optionally, each landmark may be recorded with three-dimensional coordinates $P_i=\{x_i, y_i, z_i\}$.

In the case where to-be-verified expression data of the to-be-verified expression made by the to-be-verified object is obtained, the to-be-verified expression data is compared with pre-stored expression data to obtain a comparison result in step S103. The pre-stored expression may be a template expression corresponding to the to-be-verified expression that the to-be-verified object is instructed to make; optionally, the pre-stored expression may be represented by a three-dimensional point coordinate sequence of a plurality of landmarks on a face, thus the pre-stored expression data may be a three-dimensional point coordinate sequence including a plurality of landmarks on a face, optionally, each landmark is recorded with three-dimensional coordinates $P'_i=\{x'_i, y'_i, z'_i\}$. The embodiment of the present disclosure characterizes expressions by using three-dimensional point coordinates, so that expressions are not limited to artificially defined expressions, any subtle expression changes can be depicted.

In the case where the comparison result indicates that the to-be-verified expression data matches the pre-stored expression data, the authentication device controls to release the lock in step S105.

Through the above embodiment of the present disclosure, the face-to-unlock scene is enhanced, facial expression is used to strengthen the conventional face-to-unlock technology, and the problem of distinguishing similar people is better solved.

Moreover, according to at least one embodiment of the present disclosure, comparing the to-be-verified expression data with pre-stored expression data to obtain a comparison result in step S103 may comprise: establishing an affine transformation model of the to-be-verified expression data and the pre-stored expression data; obtaining, via the affine transformation model, a plurality of affine transformation points of a plurality of landmarks from the to-be-verified expression data; and comparing the plurality of affine transformation points of the to-be-verified expression data with a plurality of pre-stored points of the pre-stored expression data to obtain the comparison result; for example, the affine transformation model of the to-be-verified expression data and the pre-stored expression data is established by using an optimal affine transformation method.

Affine transformation, also known as affine mapping, refers to that in geometry, a vector space is linearly transformed and connected to a translation, and thus transformed into another vector space. Since the to-be-verified expression data and the pre-stored expression data are represented by a three-dimensional point coordinate sequence of a plurality of landmarks on a face, the affine transformation model of the to-be-verified expression data and the pre-stored expression data may be established by using an optimal affine transformation method.

In general, affine transformation is a composition of two functions: translation and linear mapping. Ordinary vector algebras use matrix multiplication to represent linear mapping, and use vector addition to represent translation. For example, the linear mapping is represented as a matrix "B", and the translation is represented as a vector $\vec{b}$, then affine mapping between the to-be-verified expression data $\vec{P}$ sequence (a three-dimensional point coordinate sequence including a plurality of landmarks $P_1 \ldots P_i$) and the pre-stored expression data $\vec{P'}$ sequence (a three-dimensional point coordinate sequence including a plurality of landmarks $P'_1 \ldots P'_i$) may be expressed as:

$$\vec{P'}=A(\vec{P})=B\vec{P}+\vec{b},$$

wherein A is a parameter of the affine transformation model.

Accordingly, the affine transformation model of the to-be-verified expression data and the pre-stored expression data may be established by using an optimal affine transformation method, wherein the parameter A of the affine transformation model may be:

$$A_{best}=\arg\min\|A(\vec{P})-\vec{P'}\|$$

In the case of establishing the affine transformation model of the to-be-verified expression data $\vec{P}$ sequence and the pre-stored expression data $\vec{P'}$ sequence, it is possible to obtain, via the affine transformation model, a plurality of affine transformation points, i.e., $A_{best}(P_1)\ldots A_{best}(P_i)$, of a plurality of landmarks $P_1 \ldots P_i$ from the to-be-verified expression data, thereby comparing the plurality of affine transformation points $A_{best}(P_1)\ldots A_{best}(P_i)$ of the to-be-verified expression data with a plurality of pre-stored points $P'_1 \ldots P'_i$ of the pre-stored expression data to obtain the comparison result.

In addition, according to at least one embodiment of the present disclosure, comparing the plurality of affine transformation points $A_{best}(P_1)\ldots A_{best}(P_i)$ of the to-be-verified expression data with a plurality of pre-stored points $P'_1 \ldots P'_i$ of the pre-stored expression data to obtain a comparison result may comprise: determining a plurality of deviations $\Delta_1 \ldots \Delta_i$ between the plurality of affine transformation points and the plurality of pre-stored points corresponding thereto, in which:

$$\Delta_i=\|A_{best}(P_i)-P'_i\|$$

obtaining a total deviation $\Delta$ between the plurality of affine transformation points and the plurality of pre-stored points corresponding thereto according to the plurality of deviations $\Delta_1 \ldots \Delta_i$; in the case where the total deviation is less than a predetermined first threshold, the comparison result indicates that the to-be-verified expression data matches the pre-stored expression data. For example, the aforesaid first threshold may be set in advance.

In addition, according to at least one embodiment of the present disclosure, obtaining a total deviation between the plurality of affine transformation points and the plurality of pre-stored points corresponding thereto according to the plurality of deviations $\Delta_1 \ldots \Delta_i$ may comprise: obtaining deviation weights $w_1 \ldots w_i$ of the plurality of landmarks in the to-be-verified expression data, which deviation weights are endowed according to different regions which the plurality of landmarks are located on the face, the deviation weights $w_1 \ldots w_i$ may be set in advance; and weight-summing the plurality of deviations between the plurality of affine transformation points and the plurality of pre-stored points corresponding thereto according to the deviation weights, thereby obtaining the total deviation between the plurality of affine transformation points and the plurality of pre-stored points corresponding thereto, that is:

$$\Delta=\Sigma_i w_i\|A_{best}(P_i)-P'_i\|.$$

If $\Delta$ is smaller than the set first threshold, it is considered that the expression similarity assessment has been passed, and the comparison result indicates that the to-be-verified expression data matches the pre-stored expression data, thereby in step S105, the authentication device can release the lock.

In addition, in order to further enhance security and diversity of expression unlocking, it is also possible to perform expression action unlocking. According to at least one embodiment of the present disclosure, obtaining to-be-verified expression data of an to-be-verified expression of a to-be-verified object in step S101 may comprise: obtaining a plurality of to-be-verified expression data of a plurality of to-be-verified expressions, wherein the plurality of to-be-verified expressions constitute at least one expression action, the plurality of to-be-verified expression data constitute to-be-verified expression action data; comparing the to-be-verified expression data with pre-stored expression data to obtain a comparison result in step S103 may comprise: comparing the to-be-verified expression action data with pre-stored expression action data to obtain the comparison result; in the case where the comparison result indicates that the to-be-verified expression action data matches the pre-stored expression action data, the lock is released in step S105.

Since the expression action is a continuous sequence of actions composed of a series of expressions, in the case of performing expression action unlocking, the to-be-verified expression action made by the to-be-verified object may be represented by a three-dimensional point coordinate matrix of a plurality of landmarks on a face that changes with time, in this case, the to-be-verified expression action data may be a point coordinate matrix of a plurality of landmarks on a face that changes with time.

Likewise, the expression is represented by a plurality of landmarks $P_1 \ldots P_i$, then the to-be-verified expression action may be represented as:

$$\begin{pmatrix} P_{1,1} & \ldots & P_{1,j} \\ \vdots & \ddots & \vdots \\ P_{i,1} & \ldots & P_{i,j} \end{pmatrix}$$

wherein $P_{i,j}$ is a three-dimensional point coordinate of the landmark $P_i$ at a j-th moment.

Likewise, the pre-stored expression action may be also represented by a three-dimensional point coordinate matrix of a plurality of landmarks on a face that changes with time, thus the pre-stored expression action data may be a point coordinate matrix of a plurality of landmarks $P'_1 \ldots P'_i$ on a face that changes with time, then the pre-stored expression action may be represented as:

$$\begin{pmatrix} P'_{1,1} & \ldots & P'_{1,j} \\ \vdots & \ddots & \vdots \\ P'_{i,1} & \ldots & P'_{i,j} \end{pmatrix}$$

wherein $P'_{i,j}$ is a three-dimensional point coordinate of the landmark $P'_i$ at a j-th moment.

In step S101, the to-be-verified expression action data constituted by a plurality of to-be-verified expression data can be obtained. In the case where the to-be-verified expression action of the to-be-verified object includes a plurality of to-be-verified expressions, the to-be-verified expression action data and the pre-stored expression action data are denoted by at least a two-dimensional point coordinate matrix of a plurality of landmarks on the face that changes with time. It needs to be noted that, the aforesaid "at least two-dimensional" refers to i≥2, j≥2, wherein i, j are integers.

Optionally, in the case where the to-be-verified expression action of the to-be-verified object includes n to-be-verified expressions, the to-be-verified expression action data and the pre-stored expression action data may be denoted by a i*n-dimensional point coordinate matrix of a plurality of landmarks on the face that changes with time, that is, it is set that j=n.

In the case where the to-be-verified expression action data is obtained, in step S103, the to-be-verified expression action data may be compared with pre-stored expression action data to obtain the comparison result. In addition, comparing the to-be-verified expression action data with pre-stored expression action data to obtain the comparison result may comprise: establishing an affine transformation model of the to-be-verified expression action data and the pre-stored expression action data according to a time relationship; obtaining, via the affine transformation model, an affine transformation point matrix of a landmark coordinate matrix of the to-be-verified expression action data; comparing the affine transformation point matrix with a pre-stored point matrix of the pre-stored expression action data to obtain the comparison result; for example, the affine transformation model of the to-be-verified expression action data and the pre-stored expression action data is established by using an optimal affine transformation method according to a time relationship.

It needs to be noted that when performing expression action unlocking and performing expression unlocking, the methods of establishing the affine transformation model are relatively similar, the present disclosure makes no repetition herein.

In the case where the affine transformation model $A_{best}$ of the to-be-verified expression action data and the pre-stored expression action data has been established, an affine transformation point matrix of a landmark coordinate matrix of the to-be-verified expression action data may be obtained via the affine transformation model $A_{best}$:

$$\begin{pmatrix} A_{best}(P_{1,1}) & \ldots & A_{best}(P_{1,j}) \\ \vdots & \ddots & \vdots \\ A_{best}(P_{i,1}) & \ldots & A_{best}(P_{i,j}) \end{pmatrix}.$$

Further, the affine transformation point matrix may be compared with a pre-stored point matrix of the pre-stored expression action data to obtain the comparison result.

In addition, according to an embodiment of the present disclosure, comparing the affine transformation point matrix with a pre-stored point matrix of the pre-stored expression action data to obtain the comparison result may comprise: determining deviations of respective corresponding points between the affine transformation point matrix and the pre-stored point matrix; and obtaining the comparison result according to the deviations of respective corresponding points between the affine transformation point matrix and the pre-stored point matrix. Deviations of respective corresponding points are:

$$\Delta_{i,j}=\|A_{best}(P_{i,j})-P'_{i,j}\|.$$

Optionally, it is also possible to obtain deviation weights $w_1 \ldots w_i$ of the plurality of landmarks in the to-be-verified expression data, which deviation weights are endowed according to different regions which the plurality of landmarks are located on the face, and weight-sum the deviations of respective corresponding points according to the deviation weights, thereby obtaining the comparison result. Accordingly, deviations of the weighted respective corresponding points are:

$$\Delta_{i,j}=w_i\|A_{best}(P_{i,j})-P'_{i,j}\|.$$

If the total deviation $\Delta=\Sigma_{i,j}\Delta_{i,j}$ is smaller than the set threshold, it is considered that the expression action similarity assessment has been passed, and the comparison result indicates that the to-be-verified expression action data matches the pre-stored expression action data, thereby in step S105, the authentication device can release the lock.

In the case where the to-be-verified expression action of the to-be-verified object includes a plurality of to-be-verified expressions, comparing the affine transformation point matrix with a pre-stored point matrix of the pre-stored expression action data to obtain the comparison result may comprise: determining deviations of respective corresponding points between at least the two-dimensional affine transformation point matrix and at least the two-dimensional pre-stored point matrix; and obtaining the comparison result according to the deviations of respective corresponding points between at least the two-dimensional affine transformation point matrix and at least the two-dimensional pre-stored point matrix.

In addition, according to an embodiment of the present disclosure, if the to-be-verified expression action includes n to-be-verified expressions, comparing the affine transformation point matrix with a pre-stored point matrix of the pre-stored expression action data to obtain the comparison result may comprise: determining deviations of respective corresponding points between the j=n affine transformation point matrix and the j=n pre-stored point matrix; obtaining the comparison result according to the deviations of respective corresponding points between at least the two-dimensional affine transformation point matrix and at least the two-dimensional pre-stored point matrix. Herein, the deviation matrix constituted by the respective corresponding deviations are:

$$\begin{pmatrix} \Delta_{1,1} & \cdots & \Delta_{1,n} \\ \vdots & \ddots & \vdots \\ \Delta_{i,1} & \cdots & \Delta_{i,n} \end{pmatrix} \text{ where } j = n.$$

In addition, according to an embodiment of the present disclosure, obtaining the comparison result according to the deviations of respective corresponding points between the affine transformation point matrix and the pre-stored point matrix in step S103 may comprise: determining second thresholds corresponding to the deviations of respective corresponding points, for example, the second thresholds may be set in advance; and further, obtaining, based on the second thresholds corresponding to the deviations of respective corresponding points, a matching value of the to-be-verified expression action data and the pre-stored expression action data; in the case where the matching value is greater than a third threshold, the comparison result indicates that the to-be-verified expression action data matches the pre-stored expression action data. The second thresholds corresponding to the deviations of respective corresponding points may be different, the third threshold may be set in advance.

Optionally, obtaining, based on the second thresholds corresponding to the deviations of respective corresponding points, a matching value of the to-be-verified expression action data and the pre-stored expression action data may comprise: comparing the deviations of respective corresponding points with the corresponding second thresholds to obtain a comparison matrix, and obtaining a matching value of the to-be-verified expression action data and the pre-stored expression action databased on the comparison matrix.

In an embodiment of the present disclosure, the comparison matrix may be a 01 matrix. It should be noted that if each element in a matrix takes a value of 0 or 1, the matrix is a 01 matrix. Optionally, the 01 matrix may be obtained by comparing the deviation of each corresponding point with a second threshold corresponding thereto, wherein as for each point in the 01 matrix:

$$\Omega_{i,j} = \text{sign}(\Delta_{i,j} > \text{the second threshold})$$

Thus, an optimal sequence $\{(a_k, b_k)\}$, $k \in [1, L]$ can be obtained through computation, it satisfies:

$1 \le a_k \le a_{k+1} \le l$ $1 \le b_k \le b_{k+1} \le m$ $\Omega_{a_i,b_i} = 1$ max $L$ Herein, l is a sequence length of the pre-stored expression action data, and m is a sequence length of the to-be-verified expression action data. After obtaining a maximized L, the matching value value=UL/m is calculated. In the case where the value is greater than the third threshold, the comparison result indicates that the to-be-verified expression action data matches the pre-stored expression action data, so that in step S105, the authentication device can control to unlock and the expression action unlocking is successful.

In addition, if one to-be-verified expression action includes a plurality of to-be-verified expressions, for example, one to-be-verified expression action includes three to-be-verified expressions, raise eyebrow->shake head->nod head, if the user wishes to ignore the action "shake head", the embodiment of the present disclosure may reduce the second threshold corresponding to the "shake head" expression. In this case, at the time of unlocking, unlocking can be completed so long as raise eyebrow->any action->node head is completed. Thus, a "fuzzy" action can be used to perform authentication and unlocking.

For example, in the case where the to-be-verified expression action of the to-be-verified object includes at least two to-be-verified expressions, the plurality of second thresholds of the plurality of corresponding points corresponding to the at least one to-be-verified expression are made smaller than the fourth threshold. For example, the plurality of second thresholds may be set to zero to minimize.

In addition, in the process of performing expression action unlocking, if the user wishes to ignore a certain expression action, the embodiment of the present disclosure may set the plurality of second thresholds of the plurality of corresponding points corresponding to the expression action that is desired to be ignored to be smaller than a fourth threshold. For example, the plurality of second thresholds may be set to zero to minimize.

Accordingly, the embodiment of the present disclosure can, by means of using, for example, the "fuzzy" action described above, adopt a different expression action for each unlock, thereby further enhance security.

Figure 2:
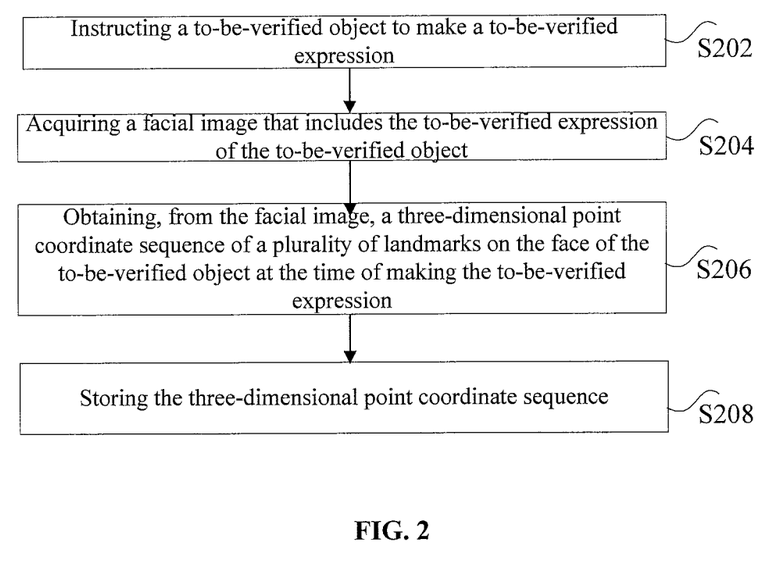
FIG. 2 is a flowchart of a method for inputting a facial expression according to an embodiment of the present disclosure.

At least one embodiment of the present disclosure further provides a method for inputting a facial expression, said method may be applied to an authentication device, and used for, for example, inputting to-be-verified expression data and pre-stored expression data of faces, as shown in FIG. 2, said method for inputting a facial expression may comprise the following steps:

Step S202, instructing a to-be-verified object to make a to-be-verified expression;

Step S204, acquiring a facial image that includes the to-be-verified expression of the to-be-verified object;

Step S206, obtaining, from the facial image, a three-dimensional point coordinate sequence of a plurality of landmarks on the face of the to-be-verified object at the time of making the to-be-verified expression; and Step S208, storing the three-dimensional point coordinate sequence.

Figure 3:
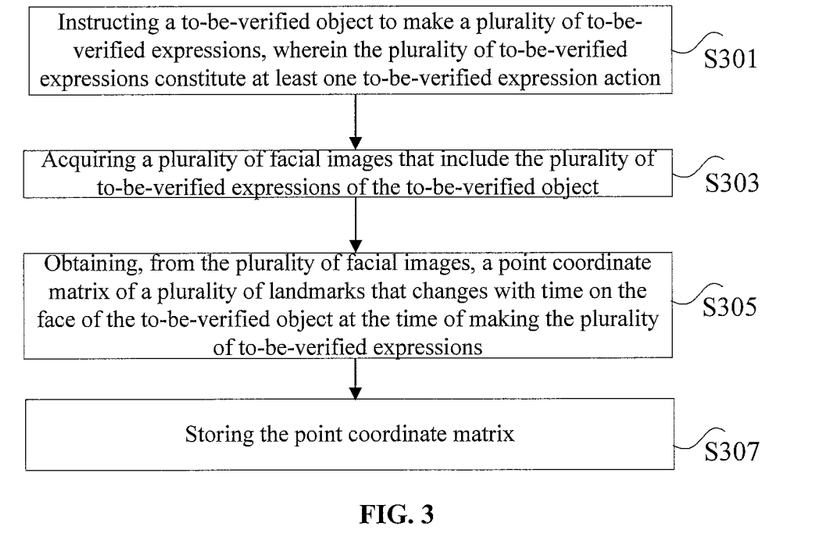
FIG. 3 is a flowchart of a method for inputting a facial expression action according to an embodiment of the present disclosure.

At least one embodiment of the present disclosure further provides a method for inputting a facial expression action, said method may be applied to an authentication device, and used for, for example, inputting to-be-verified expression action data and pre-stored expression action data of faces, as shown in FIG. 3, said method for inputting a facial expression action may comprise the following steps:

Step S301, instructing a to-be-verified object to make a plurality of to-be-verified expressions, wherein the plurality of to-be-verified expressions constitute at least one to-be-verified expression action;

Step S303, acquiring a plurality of facial images that include the plurality of to-be-verified expressions of the to-be-verified object;

Step S305, obtaining, from the plurality of facial images, a point coordinate matrix of a plurality of landmarks that changes with time on the face of the to-be-verified object at the time of making the plurality of to-be-verified expressions; and Step S307, storing the point coordinate matrix.

Through the above description of the implementations, those skilled in the art can clearly understand that the method according to the embodiment in the above may be implemented in a manner of software plus a necessary hardware platform, and of course it may also be implemented by hardware, but in many cases the former is a better implementation. Based on such understanding, the essence or the part that contributes to the prior art of the technical solution of the present disclosure may be embodied in the form of a software product, the computer software product is stored in a storage medium (such as ROM/RAM, disk, CD-ROM) and includes several instructions for causing a terminal device (which may be a mobile phone, a computer, a server, or a network device) to perform the method described in the embodiment of the present disclosure.

Figure 4:
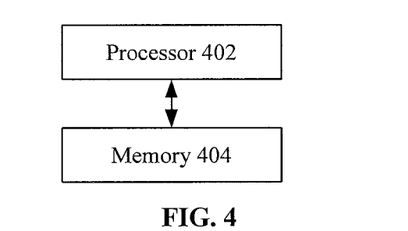
FIG. 4 is a schematic diagram of an authentication device according to an embodiment of the present disclosure.

At least one embodiment of the present disclosure further provides an authentication device, as shown in FIG. 4, the authentication device comprises a processor 402 and a memory 404, the memory 404 is configured to store computer program instructions, the computer program instructions are adapted to be loaded by the processor 402 and execute the following method: obtaining to-be-verified expression data of a to-be-verified expression of a to-be-verified object; comparing the to-be-verified expression data with pre-stored expression data to obtain a comparison result; and in the case where the comparison result indicates that the to-be-verified expression data matches the pre-stored expression data, releasing the lock.

The processor 402 may be various applicable processors, for example, implemented in the form of a central processing unit, a microprocessor, an embedded processor etc., and may adopt an architecture such as X86, ARM etc.; the memory 404 may be various applicable storage devices, for example, a non-volatile storage device, including but not limited to a magnetic storage device, a semiconductor storage device, an optical storage device etc., the embodiment of the present disclosure makes no limitations thereto.

As described above, the to-be-verified expression data and the pre-stored expression data include a three-dimensional point coordinate sequence of a plurality of landmarks on a face.

In addition, according to an embodiment of the present disclosure, the processor 402 further loads the corresponding instructions and executes the following: establishing an affine transformation model of the to-be-verified expression data and the pre-stored expression data; obtaining, via the affine transformation model, a plurality of affine transformation points of a plurality of landmarks from the to-be-verified expression data; and comparing the plurality of affine transformation points of the to-be-verified expression data with a plurality of pre-stored points of the pre-stored expression data to obtain the comparison result; wherein the affine transformation model of the to-be-verified expression data and the pre-stored expression data is established by using an optimal affine transformation method.

In addition, according to an embodiment of the present disclosure, the processor 402 further loads the corresponding instructions and executes the following: determining a plurality of deviations between the plurality of affine transformation points and the plurality of pre-stored points corresponding thereto; and obtaining a total deviation between the plurality of affine transformation points and the plurality of pre-stored points corresponding thereto according to the plurality of deviations; in the case where the total deviation is less than a predetermined first threshold, the comparison result indicates that the to-be-verified expression data matches the pre-stored expression data.

In addition, according to an embodiment of the present disclosure, the processor 402 further loads the corresponding instructions and executes the following: obtaining deviation weights of the plurality of landmarks in the to-be-verified expression data, which deviation weights are endowed according to different regions which the plurality of landmarks are located on the face; and weight-summing the plurality of deviations between the plurality of affine transformation points and the plurality of pre-stored points corresponding thereto according to the deviation weights, thereby obtaining the total deviation between the plurality of affine transformation points and the plurality of pre-stored points corresponding thereto.

In addition, according to an embodiment of the present disclosure, the processor 402 further loads the corresponding instructions and executes the following: obtaining a plurality of to-be-verified expression data of a plurality of to-be-verified expressions, wherein the plurality of to-be-verified expressions constitute at least one expression action, the plurality of to-be-verified expression data constitute to-be-verified expression action data; comparing the to-be-verified expression action data with pre-stored expression action data to obtain the comparison result; in the case where the comparison result indicates that the to-be-verified expression action data matches the pre-stored expression action data, releasing the lock.

Herein, the to-be-verified expression action data and the pre-stored expression action data include a point coordinate matrix of a plurality of landmarks on a face that changes with time.

Exemplarily, in the case where the to-be-verified expression action of the to-be-verified object includes a plurality of to-be-verified expressions, the to-be-verified expression action data and the pre-stored expression action data are denoted by at least a two-dimensional point coordinate matrix of a plurality of landmarks on the face that changes with time.

In addition, according to an embodiment of the present disclosure, the processor 402 further loads the corresponding instructions and executes the following: establishing an affine transformation model of the to-be-verified expression action data and the pre-stored expression action data according to a time relationship; obtaining, via the affine transformation model, an affine transformation point matrix of a landmark coordinate matrix of the to-be-verified expression action data; comparing the affine transformation point matrix with a pre-stored point matrix of the pre-stored expression action data to obtain the comparison result; wherein the affine transformation model of the to-be-verified expression action data and the pre-stored expression action data is established by using an optimal affine transformation method according to a time relationship.

In addition, according to an embodiment of the present disclosure, the processor 402 further loads the corresponding instructions and executes the following: determining deviations of respective corresponding points between the affine transformation point matrix and the pre-stored point matrix; and obtaining the comparison result according to the deviations of respective corresponding points between the affine transformation point matrix and the pre-stored point matrix.

In the case where the to-be-verified expression action of the to-be-verified object includes a plurality of to-be-verified expressions, in addition, according to an embodiment of the present disclosure, the processor 402 further loads the corresponding instructions and executes the following: determining deviations of respective corresponding points between at least the two-dimensional affine transformation point matrix and at least the two-dimensional pre-stored point matrix; and obtaining the comparison result according to the deviations of respective corresponding points between at least the two-dimensional affine transformation point matrix and at least the two-dimensional pre-stored point matrix.

In addition, according to an embodiment of the present disclosure, the processor 402 further loads the corresponding instructions and executes the following: determining second thresholds corresponding to the deviations of respective corresponding points; and obtaining, based on the second thresholds corresponding to the deviations of respective corresponding points, a matching value of the to-be-verified expression action data and the pre-stored expression action data; in the case where the matching value is greater than a third threshold, the comparison result indicates that the to-be-verified expression action data matches the pre-stored expression action data.

Exemplarily, the second thresholds corresponding to the deviations of respective corresponding points are different; wherein in the case where the to-be-verified expression action of the to-be-verified object includes at least two to-be-verified expressions, a plurality of second thresholds of a plurality of corresponding points that correspond to the at least one to-be-verified expression are made smaller than a fourth threshold.

Exemplarily, in the case where the to-be-verified expression action data of the to-be-verified object includes at least two to-be-verified expression actions, a plurality of second thresholds of a plurality of corresponding points that correspond to the at least one to-be-verified expression action are made smaller than a fourth threshold.

In addition, according to an embodiment of the present disclosure, the processor 402 further loads the corresponding instructions and executes the following method: instructing a to-be-verified object to make a to-be-verified expression; acquiring a facial image that includes the to-be-verified expression of the to-be-verified object; obtaining, from the facial image, a three-dimensional point coordinate sequence of a plurality of landmarks on the face of the to-be-verified object at the time of making the to-be-verified expression; and storing the three-dimensional point coordinate sequence.

In addition, according to an embodiment of the present disclosure, the processor 402 further loads the corresponding instructions and executes the following method: instructing a to-be-verified object to make a plurality of to-be-verified expressions, wherein the plurality of to-be-verified expressions constitute at least one to-be-verified expression action; acquiring a plurality of facial images that include the plurality of to-be-verified expressions of the to-be-verified object; obtaining, from the plurality of facial images, a point coordinate matrix of a plurality of landmarks that changes with time on the face of the to-be-verified object at the time of making the plurality of to-be-verified expressions; and storing the point coordinate matrix.

Through the embodiments of the present disclosure described above, people with similar faces can be effectively distinguished and the security of face-to-unlock can be further enhanced.

At least one embodiment of the present disclosure further provides a computer-readable non-volatile storage medium storing computer program instructions, the following steps are performed when the computer program instructions are executed: obtaining to-be-verified expression data of a to-be-verified expression of a to-be-verified object; comparing the to-be-verified expression data with pre-stored expression data to obtain a comparison result; and in the case where the comparison result indicates that the to-be-verified expression data matches the pre-stored expression data, releasing the lock.

At least one embodiment of the present disclosure further provides a computer-readable non-volatile storage medium storing computer program instructions, the following steps are performed when the computer program instructions are executed: instructing a to-be-verified object to make a to-be-verified expression; acquiring a facial image that includes the to-be-verified expression of the to-be-verified object; obtaining, from the facial image, a three-dimensional point coordinate sequence of a plurality of landmarks on the face of the to-be-verified object at the time of making the to-be-verified expression; and storing the three-dimensional point coordinate sequence.

At least one embodiment of the present disclosure further provides a computer-readable non-volatile storage medium storing computer program instructions, the following steps are performed when the computer program instructions are executed: instructing a to-be-verified object to make a plurality of to-be-verified expressions, wherein the plurality of to-be-verified expressions constitute at least one to-be-verified expression action; acquiring a plurality of facial images that include the plurality of to-be-verified expressions of the to-be-verified object; obtaining, from the plurality of facial images, a point coordinate matrix of a plurality of landmarks that changes with time on the face of the to-be-verified object at the time of making the plurality of to-be-verified expressions; and storing the point coordinate matrix.

Figure 5:
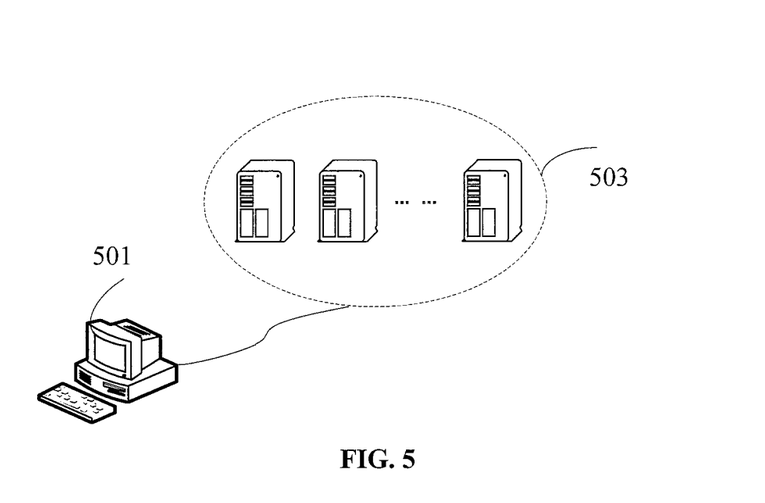
FIG. 5 is a schematic diagram of a system for face-to-unlock according to an embodiment of the present disclosure.

At least one embodiment of the present disclosure further provides a system for face-to-unlock, said system comprising an authentication device. Optionally, the system for face-to-unlock may comprise an environment as shown in FIG. 5, the environment may include a hardware environment and a network environment. The aforesaid hardware environment includes an authentication device 501 and a server 503, the authentication device 501 can operate the database through corresponding instructions so that data can be read, changed, added, and the like. Another embodiment of the present disclosure does not include a server, the database is, for example, set within the authentication device 501, that is, being set in a local machine. It should be noted that the hardware environment and structure illustrated in FIG. 5 are merely exemplary, rather than restrictive; the hardware environment may also have other components and structures as needed, and may include, for example, a gateway or the like.

The authentication device 501 may be one or multiple, and the authentication device 501 may comprise a plurality of processing nodes for processing the acquired to-be-verified expression data and to-be-verified expression action data, and the plurality of processing nodes may serve as an entirety externally. Optionally, the authentication device 501 may also send the acquired to-be-verified expression data and to-be-verified expression action data to the server 503, so that the server 503 processes the data sent by the authentication device 501. Optionally, the authentication device 501 may be connected to the server 503 through a network.

The above network includes a wired network and a wireless network. The wireless network includes, but not limited to, a wide area network, a metropolitan area network, a local area network, or a mobile data network. Typically, the mobile data network includes, but not limited to, a GSM network, a CDMA network, a WCDMA network, a LTE communication network, and a WIFI network, a ZigBee network, a Bluetooth-based network etc. Different types of communication networks may be operated by different operators. The type of communication network does not constitute a limitation on the embodiments of the present disclosure.

Figure 6:
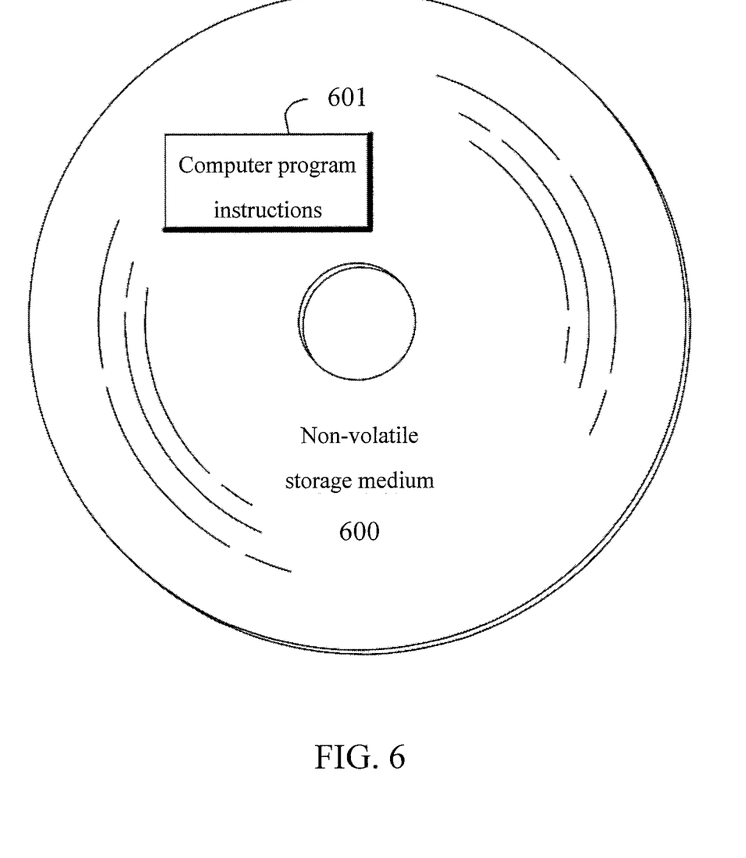
FIG. 6 is a schematic diagram of a non-volatile storage medium according to an embodiment of the present disclosure.

At least one embodiment of the present disclosure further provides a computer-readable non-volatile storage medium, as shown in FIG. 6, the non-volatile storage medium 600 according to an embodiment of the present application stores computer program instructions 601 thereon. When the computer program instructions 601 are executed by the computer, the method for face-to-unlock as described above is performed.

It should be noted that, as for the embodiments of the system, the method, the authentication device, and the storage medium described above, they are described as a series of actions or a combination of modules for the sake of brevity, but those skilled in the art should understand that the present disclosure is not limited by the sequence of the actions or the connection of modules described, because some steps may be performed in other sequences or concurrently performed according to the present disclosure, and some modules may employ other connections.

Those skilled in the art should also understand that each of the embodiments described in the specification belongs to a type of embodiment, and the above-mentioned embodiment numbers are only for description, and the actions and modules involved are not necessarily required by the present disclosure.

In the above-mentioned embodiments of the present disclosure, descriptions of the various embodiments have their own emphasis, as for details that are not explained in a certain embodiment, reference may be made to the related descriptions of other embodiments.

In the several embodiments provided by the present application, it should be understood that the disclosed technical content may be implemented by other ways. The device embodiments described above are merely illustrative, for example, the division of the units only is a logical division of functions, there may be other division manners in practical implementations, for instance, a plurality of units or components may be combined, or may be integrated in another system, or certain features may be omitted or not carried out. Further, the coupling or direct coupling or communicative connection between the respective components shown or discussed therein may be carried out via certain interfaces, and indirect coupling or communicative connection between devices or units may be electrical, or others forms.

The above units described as a separate member may be, or may not be physically separated, the components shown as a unit may or may not be a physical unit; they may be located in one place, or may be disposed on a plurality of network units; it is possible to select parts or all units among them according to actual needs to achieve the aim of the solution of the embodiments.

In addition, the respective functional units in the respective embodiments of the present disclosure may be all integrated within one processing unit, and it may also be that each unit serves as a unit independently, it may also be that two or more units are integrated within one unit; the aforesaid integrated unit not only can be implemented in the form of hardware, but also can be implemented in the form of software functional units.

The integrated unit, if implemented in the form of a software functional unit and sold or used as a standalone product, may be stored in a computer-readable storage medium. Based on such understanding, the essence or the part of the technical solutions of the present disclosure that contributes to the prior art or all or part of the technical solution may be embodied in the form of a software product stored in a storage medium and including several instructions to cause a computer device (which may be a personal computer, a server or a network device etc.) to perform all or part of the steps of the methods described in various embodiments of the present disclosure. The foregoing storage medium includes a volatile storage medium or a non-volatile storage medium, such as a variety of medium that can store program codes, such as a USB flash drive, a read-only memory (ROM), a random access memory (RAM), a mobile hard disk, a magnetic disk, or an optical disk.

The above description is only preferred embodiments of the present disclosure, and it should be noted that those of ordinary skill in the art can also make several improvements and refinements without departing from the principles of the present disclosure, these improvements and refinements should be considered as within the protection scope of the present disclosure.

What is claimed is:

1. A method for face-to-unlock, comprising:
   obtaining to-be-verified expression data of a to-be-verified expression of a to-be-verified object;
   comparing the to-be-verified expression data with pre-stored expression data to obtain a comparison result; and
   in the case where the comparison result indicates that the to-be-verified expression data matches the pre-stored expression data, releasing the lock,
   wherein the to-be-verified expression data and the pre-stored expression data include a three-dimensional point coordinate sequence of a plurality of landmarks on a face.

2. The method for face-to-unlock according to claim 1, wherein obtaining to-be-verified expression data of a to-be-verified expression of a to-be-verified object comprises:
   instructing a to-be-verified object to make a to-be-verified expression;
   acquiring a facial image that includes the to-be-verified expression of the to-be-verified object;
   obtaining, from the facial image, a three-dimensional point coordinate sequence of a plurality of landmarks on the face of the to-be-verified object at the time of making the to-be-verified expression; and
   storing the three-dimensional point coordinate sequence.

3. The method for face-to-unlock according to claim 2, wherein comparing the to-be-verified expression data with pre-stored expression data to obtain a comparison result comprises:
   establishing an affine transformation model of the to-be-verified expression data and the pre-stored expression data;

obtaining, via the affine transformation model, a plurality of affine transformation points of a plurality of landmarks from the to-be-verified expression data; and comparing the plurality of affine transformation points of the to-be-verified expression data with a plurality of pre-stored points of the pre-stored expression data to obtain the comparison result;

wherein the affine transformation model of the to-be-verified expression data and the pre-stored expression data is established by using an optimal affine transformation method.

4. The method for face-to-unlock according to claim 3, wherein comparing the plurality of affine transformation points of the to-be-verified expression data with a plurality of pre-stored points of the pre-stored expression data to obtain the comparison result comprises:

determining a plurality of deviations between the plurality of affine transformation points and the plurality of pre-stored points corresponding thereto;

obtaining a total deviation between the plurality of affine transformation points and the plurality of pre-stored points corresponding thereto according to the plurality of deviations; and in the case where the total deviation is less than a predetermined first threshold, the comparison result indicates that the to-be-verified expression data matches the pre-stored expression data.

5. The method for face-to-unlock according to claim 4, wherein obtaining a total deviation between the plurality of affine transformation points and the plurality of pre-stored points corresponding thereto according to the plurality of deviations comprises:

obtaining deviation weights of the plurality of landmarks in the to-be-verified expression data, which deviation weights are endowed according to different regions which the plurality of landmarks are located on the face; and weight-summing the plurality of deviations between the plurality of affine transformation points and the plurality of pre-stored points corresponding thereto according to the deviation weights, thereby obtaining the total deviation between the plurality of affine transformation points and the plurality of pre-stored points corresponding thereto.

6. The method for face-to-unlock according to claim 1, wherein obtaining to-be-verified expression data of a to-be-verified expression of a to-be-verified object comprises:
obtaining a plurality of to-be-verified expression data of a plurality of to-be-verified expressions, wherein the plurality of to-be-verified expressions constitute at least one expression action, the plurality of to-be-verified expression data constitute to-be-verified expression action data;

comparing the to-be-verified expression data with pre-stored expression data to obtain a comparison result comprises: comparing the to-be-verified expression action data with pre-stored expression action data to obtain the comparison result;

in the case where the comparison result indicates that the to-be-verified expression action data matches the pre-stored expression action data, releasing the lock, the to-be-verified expression action data and the pre-stored expression action data include a point coordinate matrix of a plurality of landmarks on a face that changes with time.

7. The method for face-to-unlock according to claim 6, wherein in the case where the to-be-verified expression action of the to-be-verified object includes a plurality of to-be-verified expressions, the to-be-verified expression action data and the pre-stored expression action data are denoted by at least a two-dimensional point coordinate matrix of a plurality of landmarks on the face that changes with time.

8. The method for face-to-unlock according to claim 6, wherein comparing the to-be-verified expression action data with pre-stored expression action data to obtain the comparison result comprises:

establishing an affine transformation model of the to-be-verified expression action data and the pre-stored expression action data according to a time relationship;

obtaining, via the affine transformation model, an affine transformation point matrix of a landmark coordinate matrix of the to-be-verified expression action data;

comparing the affine transformation point matrix with a pre-stored point matrix of the pre-stored expression action data to obtain the comparison result;

wherein the affine transformation model of the to-be-verified expression action data and the pre-stored expression action data is established by using an optimal affine transformation method according to a time relationship.

9. The method for face-to-unlock according to claim 8, wherein comparing the affine transformation point matrix with a pre-stored point matrix of the pre-stored expression action data to obtain the comparison result comprises:

determining deviations of respective corresponding points between the affine transformation point matrix and the pre-stored point matrix; and obtaining the comparison result according to the deviations of respective corresponding points between the affine transformation point matrix and the pre-stored point matrix.

10. The method for face-to-unlock according to claim 8, wherein in the case where the to-be-verified expression action of the to-be-verified object includes a plurality of to-be-verified expressions, comparing the affine transformation point matrix with a pre-stored point matrix of the pre-stored expression action data to obtain the comparison result comprises:

determining deviations of respective corresponding points between at least the two-dimensional affine transformation point matrix and at least the two-dimensional pre-stored point matrix; and obtaining the comparison result according to the deviations of respective corresponding points between at least the two-dimensional affine transformation point matrix and at least the two-dimensional pre-stored point matrix.

11. The method for face-to-unlock according to claim 9, wherein obtaining the comparison result according to the deviations of respective corresponding points between the affine transformation point matrix and the pre-stored point matrix comprises:

determining second thresholds corresponding to the deviations of respective corresponding points; and obtaining, based on the second thresholds corresponding to the deviations of respective corresponding points, a matching value of the to-be-verified expression action data and the pre-stored expression action data;

in the case where the matching value is greater than a third threshold, the comparison result indicates that the tobe-verified expression action data matches the pre-stored expression action data.

12. The method for face-to-unlock according to claim 11, the second thresholds corresponding to the deviations of respective corresponding points are different;
wherein in the case where the to-be-verified expression action of the to-be-verified object includes at least two to-be-verified expressions, a plurality of second thresholds of a plurality of corresponding points that correspond to the at least one to-be-verified expression are made smaller than a fourth threshold.

13. The method for face-to-unlock according to claim 11, wherein in the case where the to-be-verified expression action data of the to-be-verified object includes at least two to-be-verified expression actions, a plurality of second thresholds of a plurality of corresponding points that correspond to the at least one to-be-verified expression action are made smaller than a fourth threshold.

14. An authentication device, comprising:
a processor adapted to implement respective instructions; and
a memory adapted to store a plurality of instructions, the instructions being adapted to be loaded by the processor and execute the method for face-to-unlock according to claim 1.

15. A computer-readable non-volatile storage medium storing computer program instructions for performing the method for face-to-unlock according to claim 1, when the computer executes the program instructions.

\* \* \* \* \*